United States Patent
Zwingler et al.

(10) Patent No.: US 12,345,347 B2
(45) Date of Patent: Jul. 1, 2025

(54) HOUSING UNIT FOR A HYDRAULIC VALVE AND HYDRAULIC VALVE

(71) Applicant: Hawe Hydraulik SE, Aschheim (DE)

(72) Inventors: Engelbert Zwingler, Aschheim (DE); Thomas Ott, Aschheim (DE)

(73) Assignee: Hawe Hydraulik SE, Aschheim (DE)

( * ) Notice: Subject to any disclaimer, the term of this patent is extended or adjusted under 35 U.S.C. 154(b) by 277 days.

(21) Appl. No.: 18/053,050

(22) Filed: Nov. 7, 2022

(65) Prior Publication Data

US 2023/0144642 A1  May 11, 2023

(30) Foreign Application Priority Data

Nov. 10, 2021 (DE) .......................... 1020212126391

(51) Int. Cl.
*F16K 27/02* (2006.01)
(52) U.S. Cl.
CPC .................................. *F16K 27/029* (2013.01)
(58) Field of Classification Search
CPC ..................................................... F16K 27/029
See application file for complete search history.

(56) References Cited

U.S. PATENT DOCUMENTS

| | | | | |
|---|---|---|---|---|
| 2,828,937 A | * | 4/1958 | Kreitchman | F16K 31/0668 251/129.18 |
| 2,987,293 A | * | 6/1961 | Knudson | F02M 63/0007 251/129.18 |
| 3,633,869 A | * | 1/1972 | Lehmann | F16K 31/0689 251/129.18 |
| 4,530,486 A | * | 7/1985 | Rusnak | F16K 31/0668 251/129.18 |
| 4,834,337 A | * | 5/1989 | Chorkey | F16K 31/0655 251/129.18 |
| 5,074,326 A | * | 12/1991 | Baker | H01F 7/081 251/129.18 |
| 5,548,263 A | * | 8/1996 | Bulgatz | H01F 7/1638 251/129.18 |
| 5,842,679 A | * | 12/1998 | Kolchinsky | F16K 31/408 251/129.18 |

FOREIGN PATENT DOCUMENTS

| | | |
|---|---|---|
| DE | 102009053388 A1 | 5/2011 |
| DE | 511 599 A4 | 1/2013 |
| DE | 102020103176 A1 | 8/2021 |

* cited by examiner

*Primary Examiner* — Eric Keasel
(74) *Attorney, Agent, or Firm* — DINSMORE & SHOHL LLP

(57) ABSTRACT

A housing unit for a hydraulic valve with an actuating device includes a first housing part with an internal thread and a second housing part with an external thread. A valve piston is disposed in the first housing part and an actuating element of the actuating device is disposed in the second housing part. The actuating element is operatively connected to the valve piston in the axial direction. The second housing part is only partially screwed into the first housing part in the assembled state of the housing unit. The housing unit further includes a securing device, which prevents a relative movement between the internal thread and the external thread in the assembled state of the housing unit in such a way that an operating point of the actuating device is set.

10 Claims, 5 Drawing Sheets

HOUSING UNIT FOR A HYDRAULIC VALVE AND HYDRAULIC VALVE

CROSS-REFERENCE TO RELATED APPLICATIONS

This application claims priority to German Application 10 2021 212 639.1, filed Nov. 10, 2021, which is hereby incorporated by reference in its entirety.

FIELD OF THE INVENTION

The present invention relates to a housing unit for a hydraulic valve with an actuating device and a hydraulic valve.

BACKGROUND OF THE INVENTION

Hydraulic valves with actuating devices are generally known. The actuating device may be, for example, an electromagnetic actuating device, a manual actuating device, a hydraulic actuating device or a pneumatic actuating device. Such hydraulic valves comprise a housing unit comprising a first housing part with an internal thread and a second housing part with an external thread. The external thread of the second housing part is screwed into the internal thread of the first housing part. A valve piston is disposed in the first housing part and an actuating element of the actuating device is disposed in the second housing part. The actuating element is operatively connected to the valve piston in the axial direction.

Such actuating devices are used, among other things, in hydraulic directional or directional seated valves, which can also be configured as screw-in valves. In an electromagnetic actuating device, one or more electric coils cooperate in a generally known manner with the actuating element configured as an armature in order to actuate the valve piston by axial displacement of the armature by means of magnetic force and thus to realize different switching positions of the respective hydraulic valve. The valve piston is often actuated by the armature via a valve tappet, which is disposed between the armature and the valve piston and transmits the axial movement of the armature to the valve piston, thus forming the operative connection between the armature and the valve piston.

The second housing part is regularly screwed completely into the first housing part over a relatively short threaded distance, i.e. up to a stop in the first housing part, in order to minimize the overall installation space required and to prevent the housing parts from coming loose.

When assembling such hydraulic valves, care must be taken to ensure accurate valve adjustment. In particular, the interaction of the actuating device and the valve piston must be precisely adjusted in order to set an operating point of the actuating device on the force-stroke characteristic and thus positively influence technical properties of the hydraulic valve, such as hydraulic characteristic values or wear properties. This valve adjustment is performed and checked manually during the assembly of each such hydraulic valve.

At present, such valve adjustment is carried out by keeping individual components of the hydraulic valve in different configurations, such as valve tappets with different lengths, or by machining individual valve components during assembly, for example by grinding. During valve adjustment, measurement processes are regularly necessary in the disassembled and also in the assembled state of the hydraulic valve, and in some cases the hydraulic valves have to be disassembled and reassembled several times in order to achieve the desired accuracy of the valve adjustment by iteratively approaching the desired operating point. The stocking of individual components in different versions not only increases storage costs, but also requires special precision in the manufacture of the corresponding individual components. Manual machining during assembly takes more time and also requires special precision.

SUMMARY OF THE INVENTION

It is therefore the objective of the present invention to reduce the assembly effort for hydraulic valves with an actuating device and, at the same time, to enable a reliable and precise adjustment of the hydraulic valves.

The housing unit according to the invention differs from the prior art in that the second housing part is only partially screwed into the first housing part in the assembled state of the housing unit, and the housing unit further comprises a securing device, wherein the securing device prevents a relative movement between the internal thread of the first housing part and the external thread of the second housing part in the assembled state of the housing unit such that an operating point of the electromagnetic actuating device is set.

In particular, the securing device is a releasable securing device. In particular, the first housing part is a valve piston housing and the second housing part is an armature housing. In particular, the housing unit is formed as a screw-in cartridge. That the second housing part is "only partially" screwed into the first housing part means that the second housing part is not completely screwed into the first housing part up to a stop. The "assembled state" of the housing unit means that the housing unit according to the invention is completely assembled and set and ready for the intended use. In particular, in the assembled state, no further measures need to be taken to fine-tune the hydraulic valve by using the housing unit according to the invention. In the assembled state of the housing unit, the securing device prevents the relative movement between the internal thread and the external thread in such a way that the axial positioning of the first housing part relative to the second housing part is maintained even when the housing unit according to the invention is used in a hydraulic valve, in particular therefore also under the action of pressures in a hydraulic system in which the hydraulic valve is used.

By means of the housing unit according to the invention, the axial fine adjustment of an operating point of a hydraulic valve with an actuating device can be achieved solely by the screw connection between the first housing part and the second housing part and by securing the axial position of the first housing part to the second housing part by the securing device. This enables fine adjustment of the hydraulic valve without having to stock different components in different configurations or having to perform additional machining steps on components during assembly. In addition, the first housing part and the second housing part no longer have to be completely separated from each other and screwed back into each other during assembly for axial fine adjustment. The fine adjustment is performed solely by screwing the first housing part and the second housing part together and securing the axial positioning with the securing device. By only partially screwing the second housing part into the first housing part, the axial variability necessary for fine adjustment of the operating point of the actuating device is achieved. The internal thread of the first housing part and the external thread of the second housing part are thus axially longer than in conventional housing units.

Preferably, the actuating device is an electromagnetic actuating device. In this context, it is also preferable if the actuating element is an armature.

Preferably, the securing device comprises at least one separate component. This enables precise, reliable and reversible securing of the axial positioning between the first housing part and the second housing part.

Preferably, the securing device comprises a thread sealing ring. The thread sealing ring is an embodiment of a separate component and is disposed in particular in a circumferential groove in the internal thread of the first housing part. Alternatively, the thread sealing ring may be disposed in a circumferential groove in the external thread of the second housing part. Alternatively, a first sealing ring may be disposed in a first circumferential groove in the internal thread of the first housing part and a second sealing ring may be disposed in a second circumferential groove in the external thread of the second housing part. By configuring the securing device as a thread sealing ring, precise, reliable and reversible securing of the axial positioning between the first housing part and the second housing part can be realized.

Preferably, the securing device comprises a threaded pin which is screwed into a threaded hole in the first housing part and presses against the external thread of the second housing part. The threaded pin is an embodiment of a separate component. Furthermore, it is preferably if the securing device comprises a plurality of threaded pins which are screwed into a corresponding number of threaded holes in the first housing part and press against the external thread of the second housing part. Further, it is conceivable that the plurality of threaded pins and the corresponding threaded holes are evenly distributed along the circumferential direction of the first housing part. Alternatively, the threaded pins and the corresponding threaded holes may be distributed randomly along the circumferential direction of the first housing part. By configuring the securing device as a threaded pin, precise, reliable and reversible securing of the axial positioning between the first housing part and the second housing part can be realized.

Preferably, the securing device comprises a lock nut. The lock nut is an embodiment of a separate component. The configuration of the securing device as a lock nut allows precise, reliable and reversible securing of the axial positioning between the first housing part and the second housing part.

Preferably, the securing device comprises a clamping thread. The clamping thread is an embodiment of a separate component. In particular, the clamping thread is disposed in an axial groove in the internal thread of the first housing part. Alternatively, the clamping thread may be disposed in an axial groove in the external thread of the second housing part. Alternatively, a plurality of clamping threads may be disposed in a corresponding number of axial grooves, the axial grooves being disposed in the internal thread of the first housing part and/or in the external thread of the second housing part. By configuring the securing device as a clamping thread, precise, reliable and reversible securing of the axial positioning between the first housing part and the second housing part can be realized.

Preferably, securing device comprises a threadlocker. In particular, the threadlocker is applied between the internal thread of the first housing part and the external thread of the second housing part. By configuring the securing device as a threadlocker, precise, reliable and reversible securing of the axial positioning between the first housing part and the second housing part can be realized.

Preferably, the securing device comprises a sluggish thread. The sluggish thread is preferably implemented by a change in the thread flank diameter of the internal thread and/or external thread and/or a different thread pitch of the internal thread and external thread and/or a self-locking thread and/or a sluggish coating on the internal thread and/or on the external thread. By configuring the securing device as a heavy-duty thread, it is possible to realize precise, reliable and reversible locking of the axial positioning between the first housing part and the second housing part.

Furthermore, the problem is solved with a hydraulic valve with an actuating device and a housing unit according to the invention. The actuating device is in particular an electromagnetic actuating device, the electromagnetic actuating device comprising the armature and a coil arrangement. Advantageously, the hydraulic valve is a directional control valve, in particular a directional seat valve. The assembly effort of the hydraulic valve configured in this way is considerably reduced. At the same time, reliable and precise adjustment of the hydraulic valve is possible.

The invention is explained in more detail below with reference to embodiments shown in the figures.

BRIEF DESCRIPTION OF THE DRAWINGS

FIG. 1b is a detailed view from FIG. 1a;

FIG. 2b is a detailed view from FIG. 2a;

FIG. 3b is a detailed view from FIG. 3a;

FIG. 4b is a detailed view from FIG. 4a;

FIG. 5b is a detailed view from FIG. 5a.

DETAILED DESCRIPTION OF THE INVENTION

Figure 1A:
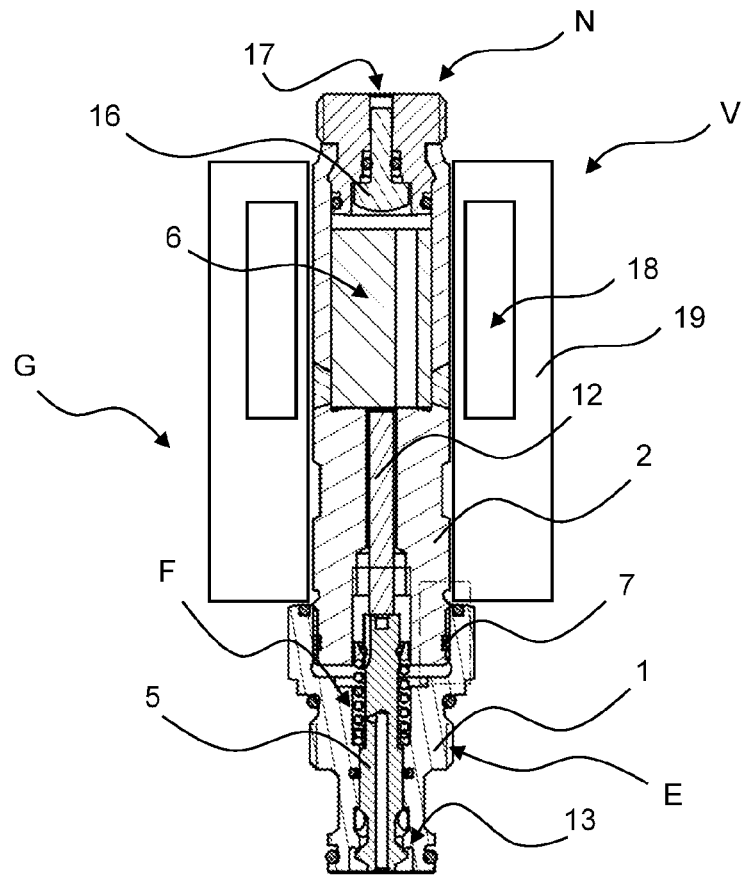
FIG. 1a is a sectional view of a hydraulic valve with a first embodiment of a housing unit according to the invention.

FIG. 1a shows a sectional view of a hydraulic valve V with an actuating device in the form of an electromagnetic actuating device. The hydraulic valve comprises a first embodiment of a housing unit G according to the invention with a first housing part 1 with an internal thread 3 and a second housing part 2 with an external thread 4. As can be seen in the detailed view from FIG. 1a shown in FIG. 1b, the external thread 4 of the second housing part 2 is screwed into the internal thread 3 of the first housing part 1. A valve piston 5 is disposed in the first housing part 1 and an actuating element in the form of an armature 6 of the electromagnetic actuating device is disposed in the second housing part 2. The armature 6 is operatively connected to the valve piston 5 in the axial direction. In the embodiment shown, the armature 6 is operatively connected to the valve piston 5 via a valve tappet 12. This means that the valve tappet 12 transmits an axial movement of the armature 6, looking downward in the direction of FIG. 1a, to the valve piston 5 and moves the latter in order to realize various switching positions of the hydraulic valve V. A spring F acts as a return element on the valve piston 5.

In a generally known manner, the electromagnetic actuating device comprises the armature 6 and a coil arrangement 18 within a separate component 19 shown in FIG. 1a. The armature 6 is arranged in an armature space in the second housing part 2 and is only shown schematically in FIG. 1a, since different configurations of armatures of electromagnetic actuating devices for hydraulic valves are generally known. The coil arrangement 18 is disposed in the separate component 19 which is slid over the second housing part 2 during assembly of the hydraulic valve V and is disposed radially outside the second housing part 2 when the hydraulic valve V is assembled.

The hydraulic valve V of the embodiment shown is a 2/2-way seated valve with a conical seat, which is designed as a screw-in cartridge with electromagnetic actuating device and emergency release N. As can be seen in FIG. 1a, the valve piston 5 rests against a valve seat 13 in the first housing part 1 and is consequently in its closed position in the position shown. Via a screw-in thread E, which is formed as an external thread on the first housing part 1, the housing unit G can be screwed into any hydraulic system in which it is to be used. The emergency release N comprises an actuating element 16 which, if required, can be actuated by a user by inserting a tool into an opening 17 and pushed in the direction of the armature 6 so as to lift the valve piston 5 from its valve seat 13 and manually unlock the hydraulic valve V.

Figure 1B:
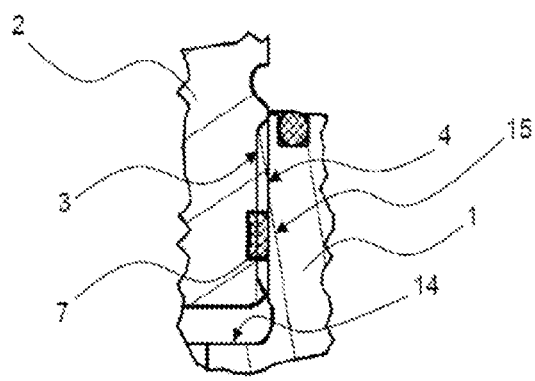

As can be seen clearly in particular in FIG. 1b, the second housing part 2 is only partially screwed into the first housing part 1. The housing unit G further comprises a securing device which, in the assembled state of the housing unit G shown here, prevents relative movement between the internal thread 3 and the external thread 4 in such a way that an operating point of the electromagnetic actuating device is set.

As can be seen in FIG. 1b, the second housing part 2 is not completely screwed into the first housing part 1 up to a stop 14. The securing device according to the first embodiment is a separate component in the form of a thread sealing ring 7, which is arranged in a circumferential groove 15 in the internal thread 3 of the first housing part 1.

Due to the longer screw-in distance between the internal thread 3 and the external thread 4 compared to conventional housing units, the axial positioning of the second housing part 2 to the first housing part 1 and thus the axial positioning of the armature 6 to the valve piston 5 can be precisely adjusted during assembly. Finally, the securing device, the thread sealing ring 7 in this exemplary embodiment, ensures that relative movement between the internal thread 3 and the external thread 4 is prevented in such a way that the axial positioning of second housing part 2 to first housing part 1 does not change even under pressure from hydraulic fluid and thus the operating point of the electromagnetic actuating device is set. This structural design of the housing unit G enables precise and reliable adjustment of the operating point of the electromagnetic actuating device without, for example, having to keep valve tappets 12 of different lengths on stock or having to machine the valve tappet 12 during assembly and, under certain circumstances, having to screw the second housing part 2 completely out of the first housing part 1 and back in again several times. This enables a considerable increase in efficiency during assembly of the hydraulic valve V.

In FIGS. 2a to 5b, a second, third, fourth and fifth or sixth embodiment of the housing unit G are shown. The housing unit G according to the embodiments shown in FIGS. 2a to 5b differs from the housing unit G of the first embodiment shown in FIGS. 1a and 1b solely in the configuration of the securing device. Therefore, only the aspects of the housing unit G relevant to describing the respective securing device are shown in FIGS. 2a to 5b.

Figure 2A:
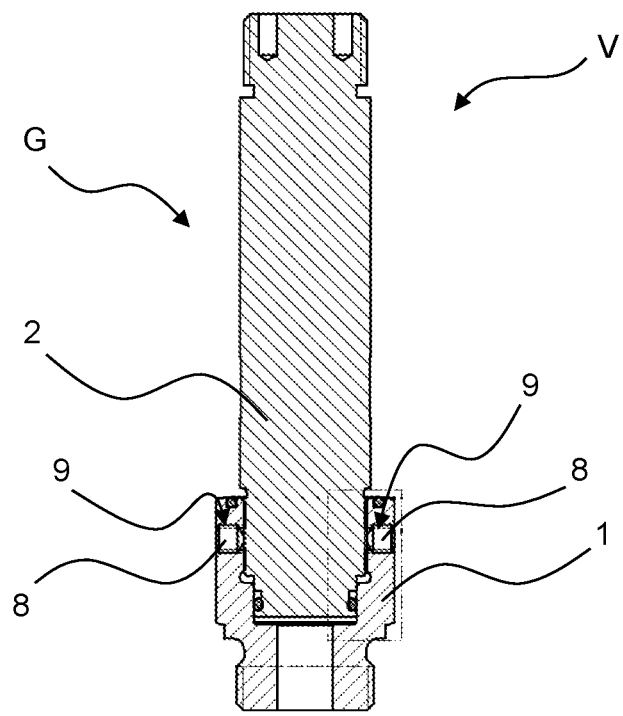
FIG. 2a is a sectional view of a hydraulic valve with a second embodiment of a housing unit according to the invention.
Figure 2B:
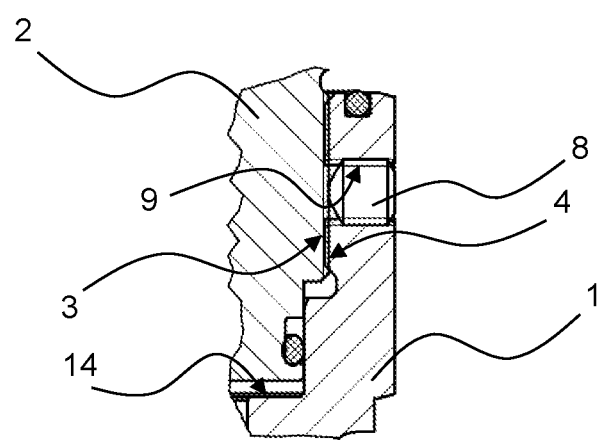

As shown in FIGS. 2a and 2b, the securing device of the housing unit G according to the second embodiment comprises a separate component in the form of a threaded pin 8 which is screwed into a threaded hole 9 in the first housing part 1 and presses against the external thread 4 of the second housing part 2. More precisely, the securing device according to the second embodiment comprises two threaded pins 8 in two threaded bores 9 which are evenly distributed along the circumferential direction of the first housing part 1, namely arranged opposite each other. It is obvious to the person skilled in the art that the securing device may also comprise three or more threaded pins 8 in a corresponding number of threaded holes 9.

Figure 3A:
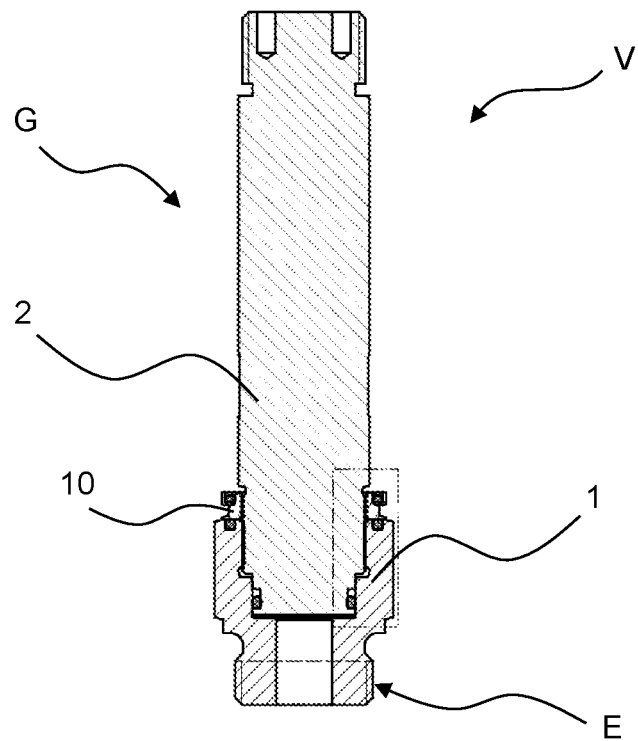
FIG. 3a is a sectional view of a hydraulic valve with a third embodiment of a housing unit according to the invention.
Figure 3B:
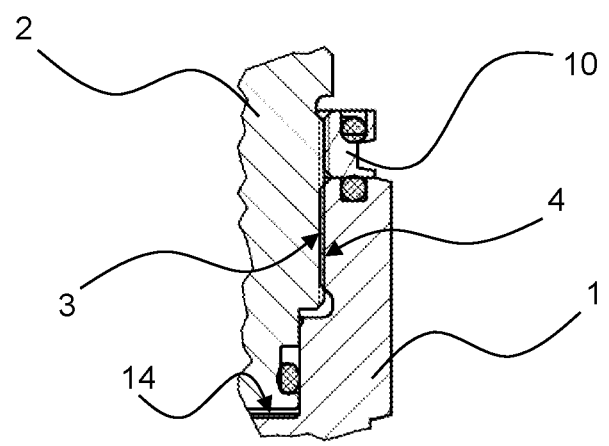

As shown in FIGS. 3a and 3b, the securing device of the housing unit G according to the third embodiment comprises a separate component in the form of a lock nut 10. The lock nut 10 is disposed above the first housing part 1 on the external thread 4 of the second housing part 2. The outer diameter of the lock nut 10 is smaller than the outer diameter of the first housing part 1, so that in the assembled state of the first housing part 1 and second housing part 2 a user can engage a tool with the first housing part 1 over the lock nut 10 in order to screw it into a housing of a hydraulic system by means of the screw-in thread E.

Figure 4A:
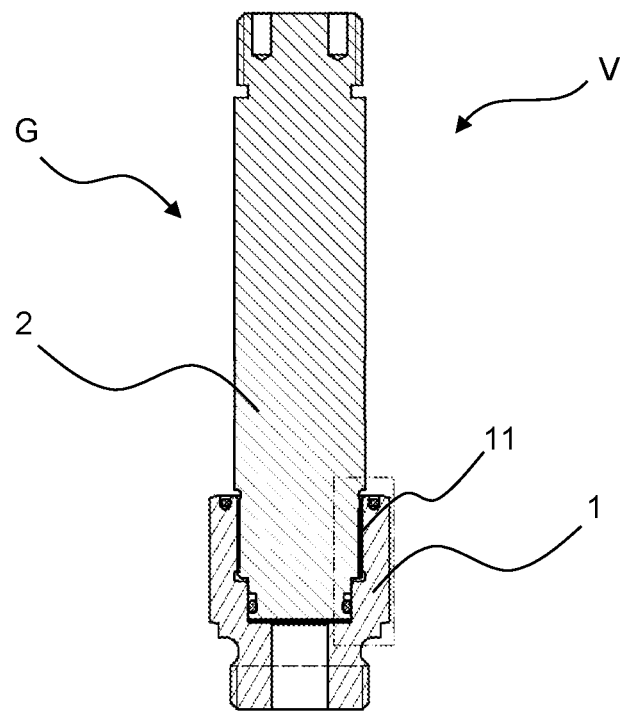
FIG. 4a is a sectional view of a hydraulic valve with a fourth embodiment of a housing unit according to the invention.
Figure 4B:
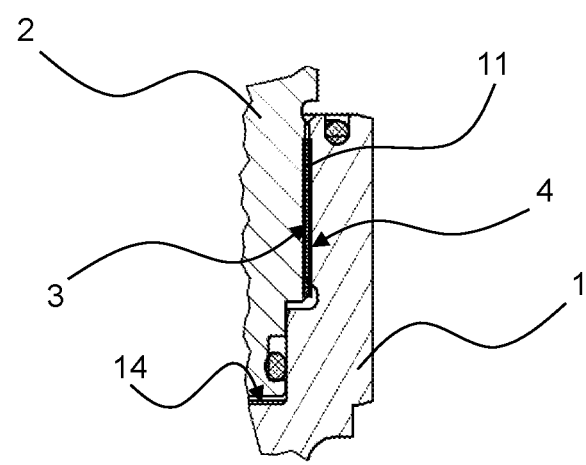

As shown in FIGS. 4a and 4b, the securing device of the housing unit G according to the fourth embodiment comprises a separate component in the form of a clamping thread 11. The clamping thread 11 is disposed in an axial groove in the internal thread 3 of the first housing part 1. However, it is apparent to a person skilled in the art that the clamping thread 11 can also be disposed in an axial groove in the external thread 3 of the second housing part 2 and that the securing device can also comprise a plurality of clamping threads 11 in corresponding axial grooves.

As can be seen in FIGS. 1a to 4b, the securing device according to the first, second, third and fourth embodiments comprises at least one separate component. According to the first embodiment according to FIGS. 1a and 1b, the securing device comprises the thread sealing ring 7. According to the second embodiment according to FIGS. 2a and 2b, the securing device comprises the threaded pins 8 in the threaded holes 9. According to the third embodiment according to FIGS. 3a and 3b, the securing device comprises the lock nut 10. According to the fourth embodiment according to FIGS. 4a and 4b, the securing device comprises the clamping thread 11.

Figure 5A:
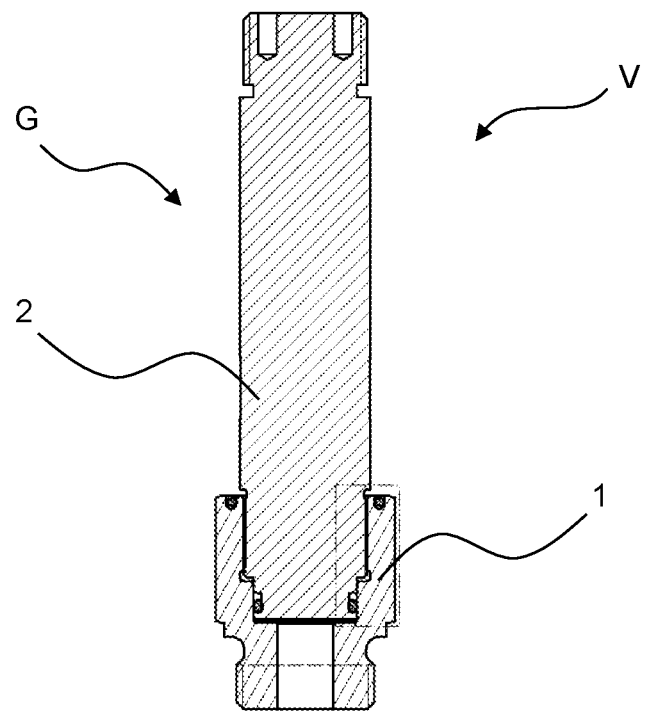
FIG. 5a is a sectional view of a hydraulic valve with a fifth or sixth embodiment of a housing unit according to the invention.
Figure 5B:
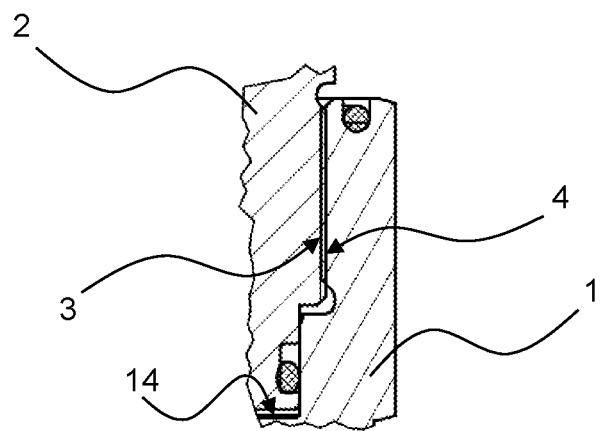

As can be seen in FIGS. 5a and 5b, the securing device of the housing unit G according to the fifth and sixth embodiments, respectively, does not comprise a separate component. According to the fifth embodiment, the securing device comprises a threadlocker. According to the sixth embodiment, the securing device comprises a sluggish thread. The sluggish thread can be realized by a change in the thread flank diameter of the internal thread 3 and/or the external thread 4 and/or a different thread pitch of the internal thread 3 and the external thread 4 and/or a self-locking thread and/or a sluggish coating on the internal thread 3 and/or on the external thread 4. The securing device according to the fifth and sixth embodiments also prevent a relative movement between the internal thread 3 and the external thread 4 in the assembled state of the housing unit G in such a way that an operating point of the electromagnetic actuating device of the hydraulic valve V is set.

It is obvious to the skilled person that the securing device according to the embodiments described above can also be combined with each other if required, for example, one or more threaded pins in combination with a thread sealing ring.

REFERENCE NUMERALS 1 first housing part
2 second housing part
3 internal thread
4 external thread
5 valve piston
6 actuating element/armature
7 thread sealing ring
8 threaded pin
9 threaded hole
10 lock nut
11 camping thread
12 valve tappet
13 valve seat
14 stop
15 circumferential groove
16 actuating element
17 opening
18 coil arrangement
19 separate component
E screw-in thread
F spring
G housing unit
N emergency release
V hydraulic valve

The invention claimed is:

1. A hydraulic valve comprising a housing unit and an actuating device, the housing unit comprising:
a first housing part with an internal thread;
a second housing part with an external thread, wherein the external thread of the second housing part is screwed into the internal thread of the first housing part;
a valve piston disposed in the first housing part;
an actuating element of the actuating device disposed in the second housing part, wherein the actuating element is operatively connected to the valve piston in an axial direction and actuated by a coil arrangement of the actuating device disposed radially outside the second housing part, and the second housing part is only partially screwed into the first housing part in an assembled state of the housing unit; and
a securing device, the securing device preventing a relative movement between the internal thread of the first housing part and the external thread of the second housing part in the assembled state of the housing unit such that an operating point of the actuating device is set.

2. The hydraulic valve according to claim 1, wherein the actuating device is an electromagnetic actuating device and the actuating element is an armature.

3. The hydraulic valve according to claim 1, wherein the securing device comprises at least one separate component.

4. The hydraulic valve according to claim 3, wherein the securing device comprises at least one thread sealing ring.

5. The hydraulic valve according to claim 3, wherein the securing device comprises at least one threaded pin which is screwed into at least one threaded bore in the first housing part and presses against the external thread of the second housing part.

6. The hydraulic valve according to claim 3, wherein the securing device comprises at least one lock nut.

7. The hydraulic valve according to claim 3, wherein the securing device comprises at least one clamping thread.

8. The hydraulic valve according to claim 1, wherein the securing device comprises a threadlocker.

9. The hydraulic valve according to claim 1, wherein the securing device comprises a sluggish thread.

10. The hydraulic valve according to claim 9, wherein the sluggish thread is implemented by a change in a thread flank diameter of the internal thread and/or external thread and/or a different thread pitch of the internal thread and external thread and/or a self-locking thread and/or a sluggish coating on the internal thread and/or on the external thread.

* * * * *